E. O. CLARK.
HEADLIGHT FOR LOCOMOTIVES AND MOTOR CARS.
APPLICATION FILED APR. 29, 1912.

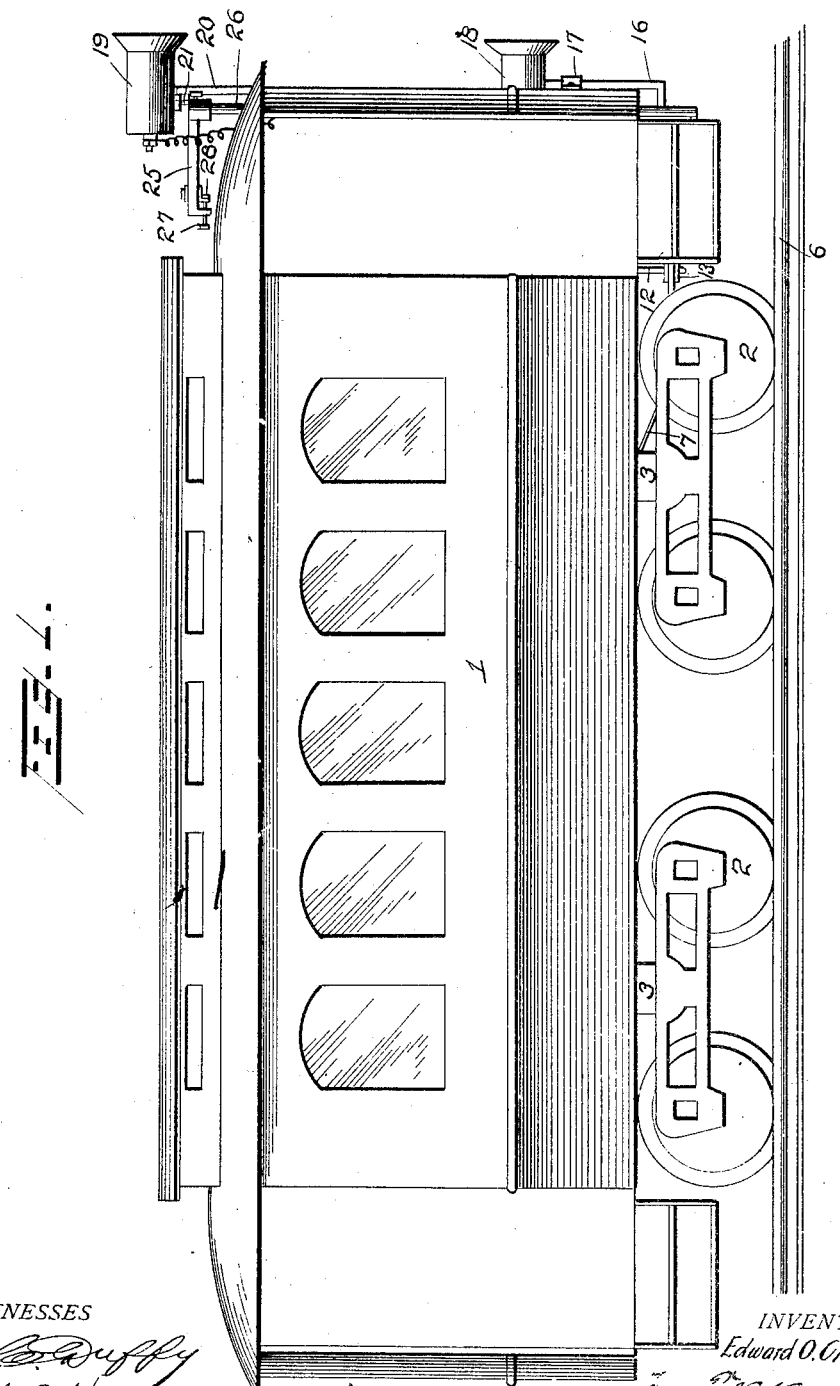

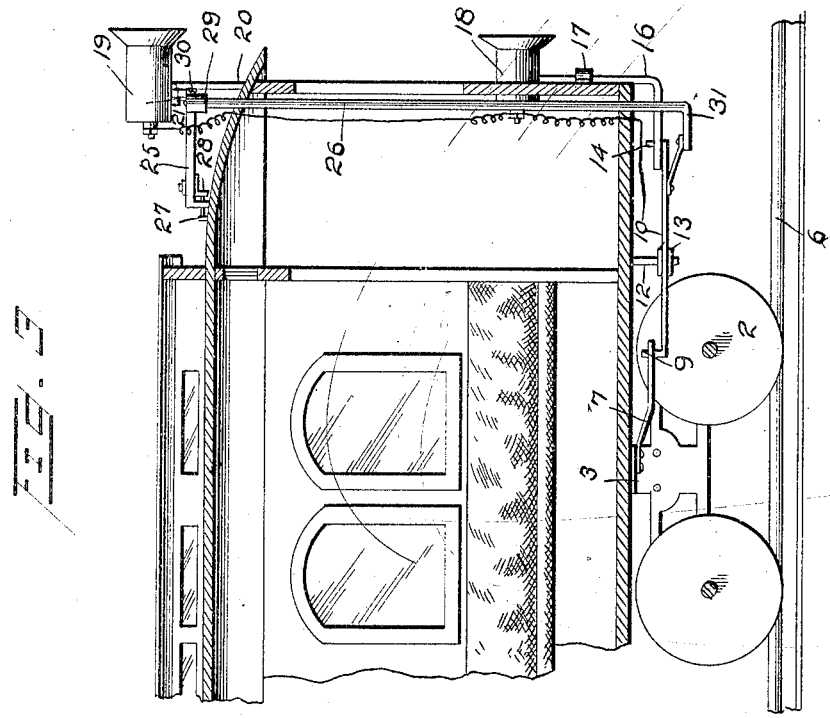

1,047,170.

Patented Dec. 17, 1912.
3 SHEETS—SHEET 3.

WITNESSES

INVENTOR:
Edward O. Clark

UNITED STATES PATENT OFFICE.

EDWARD O. CLARK, OF SPOKANE, WASHINGTON, ASSIGNOR OF ONE-THIRD TO EDWARD A. MOYE, OF SPOKANE, WASHINGTON.

HEADLIGHT FOR LOCOMOTIVES AND MOTOR-CARS.

1,047,170.  Specification of Letters Patent.  Patented Dec. 17, 1912.

Application filed April 29, 1912. Serial No. 693,900.

*To all whom it may concern:*

Be it known that I, EDWARD O. CLARK, a citizen of the United States of America, residing at Spokane, in the county of Spokane and State of Washington, have invented certain new and useful Improvements in Headlights for Locomotives and Motor-Cars, of which the following is a specification.

This invention relates to headlights for locomotives, motor cars and similar conveyances and one of the principal objects of the invention is to provide means for automatically turning the headlights into the direct line of travel of the locomotive or other conveyance.

Another object of the invention is to provide one or more headlights for a locomotive, motor car or other conveyance and to provide means whereby when the locomotive passes around a curve in either direction, the headlight will be thrown directly in the path of travel automatically, thus giving the engineer or motorman a clear view of the track upon both sides and in rounding curves.

Still another object of the invention is to provide simple, reliable and efficient means for pivotally connecting the headlight or headlights to the front axle of the locomotive or motor car, so that the movement of the axle in rounding curves will move the headlight to a direct line of travel of the locomotive or motor car without attention on the part of the engineer or motorman.

Figure 4:
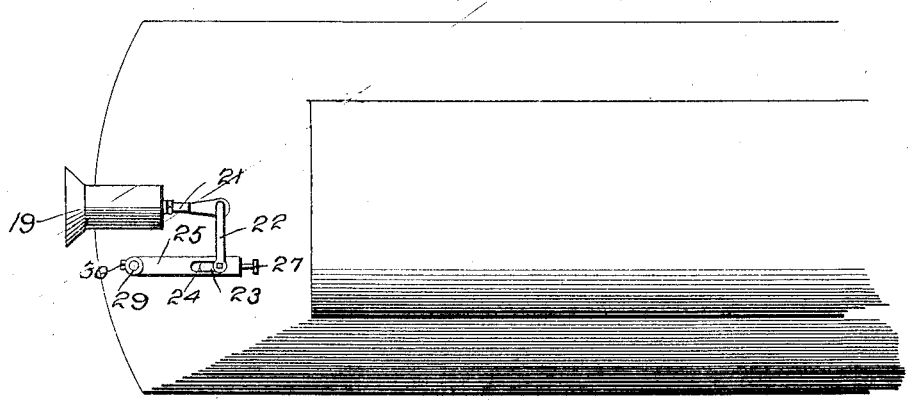
Figure 5:
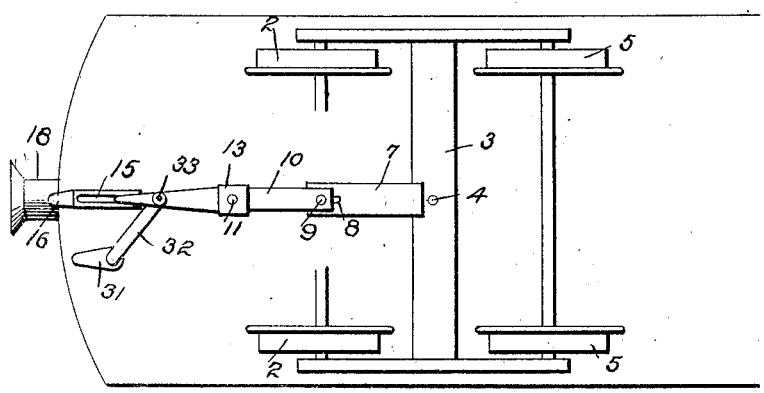

These and other objects may be attained by means of the construction illustrated in the accompanying drawings, in which:

Figure 1 is a side elevation of a motor car having its headlights constructed and mounted in accordance with this invention; Fig. 2 is a front end elevation of the car; Fig. 3 is a vertical longitudinal sectional view of the front end of the car; Fig. 4 is a top plan view of the same; and Fig. 5 is a bottom plan view.

While I have shown in the accompanying drawings my invention as applied to a motor car, it will be understood that the same or a similar construction may be placed upon a locomotive or other similar conveyance, without departing from the spirit or scope of the invention as defined in the claims.

Referring to the drawings, the numeral 1 designates a motor car which may be of the usual or any suitable construction and 2 are the front wheels supported upon a bolster 3, said bolster being pivoted at 4 underneath the front end of the car. The wheels 2 and 5 are mounted on the front bolster 3 in the usual or any suitable manner. When the car is rounding a curve on the rails 6, the bolster 3 will turn on its pivotal point 4.

Connected centrally to the bolster 3 is a bar 7 which extends toward the front of the car and is provided with a longitudinal slot 8. Pivotally mounted in the slot 8 is a stud or pin 9 formed on or connected to a lever 10, said lever being pivoted centrally at 11 upon a bolt or rod 12 and said lever being held in place by means of stop nuts 13 on opposite sides of said lever. The front end of said lever is preferably tapering in form and provided with an upwardly extending stud or pin 14 which extends through a slot 15 in an angular support 16, said support being mounted to rotate freely in a keeper 17 on the front of the car 1, and said support 16 has attached to its upper end the headlight 18.

When it is found necessary to use an upper and a lower headlight, the upper light 19 is pivotally connected to a suitable support 20 at the top of the car. Rigidly connected to the light 19 is an arm 21 and pivoted to the arm 21 is a link 22 pivotally connected to a sliding block 23 mounted in a slot 24 in an arm 25 mounted on the top of the vertical rod 26 extending down through the front end of the car. In order to render the throw of the link 22 adjustable, a set screw 27 is mounted in a bracket on the end of the arm 25, said set screw being mounted in a lug 28 on the sliding block 23. The arm 25 is provided with a bearing boss 29 and is secured to the vertical rod 26 by means of a binding screw 30. The lower end of the rod 26 is bent at right angles, as at 31 under the front end of the car and a link 32 is pivoted at one end of the foot 31 while the opposite end is pivoted at 33 to the lever 10. Thus the movement of the bolster 3 actuates both lights automatically upon rounding curves in either direction.

The operation of my invention may be briefly described as follows: When the locomotive or car rounds a curve in either direction the turning of the bolster 3 will, through the various connections described, reflect the light immediately in the center of the track to give the engineer or motorman a full view directly in front of the locomotive or car without any attention on his part.

From the foregoing, it will be obvious that a headlight made in accordance with my invention is comparatively simple in construction, may be applied to any locomotive, motor car or similar conveyance without great expense in installing the same, that the operation of the light is entirely automatic, requiring no attention on the part of the engineer or motorman, and that the entire device is comparatively simple in construction and not liable to get out of order.

I claim:

1. An automatically operated headlight for locomotive or motor cars comprising a front bolster pivoted to the car, an angular support for a lamp in front of the car, pivotal connections between said support and the bolster for turning said lamp in the path to be traveled by the car, a lamp mounted on said angular support, a lamp at the top of the car, and connections between the upper lamp and said bolster for turning said lamp simultaneously with the first mentioned lamp to cast its light in front of the car in rounding curves.

2. Automatically operated headlights for locomotives and motor cars, comprising two lamps, one at the front and one at the top of the car, an angular support for the front lamp, a front bolster pivoted under the car, a lever pivotally connected to the car, a bar connected to the bolster, said lever being pivoted to said bar, and connections between the top lamp and said lever for turning both lamps simultaneously in the same direction to cast the light rays in the path of travel in front of the car in rounding curves.

In testimony whereof I affix my signature in presence of two witnesses.

EDWARD O. CLARK.

Witnesses:
 E. A. MOYE,
 T. F. KILBY.